(12) United States Patent
LaCroix

(10) Patent No.: US 7,622,885 B2
(45) Date of Patent: Nov. 24, 2009

(54) LINEAR ELECTRIC MOTOR CONTROLLER AND SYSTEM FOR PROVIDING LINEAR CONTROL

(75) Inventor: Michael Charles LaCroix, Hamilton (CA)

(73) Assignee: 2112376 Ontario Limited, Toronto, ON (CA)

( * ) Notice: Subject to any disclaimer, the term of this patent is extended or adjusted under 35 U.S.C. 154(b) by 0 days.

(21) Appl. No.: 11/832,024

(22) Filed: Aug. 1, 2007

(65) Prior Publication Data

US 2008/0024084 A1    Jan. 31, 2008

Related U.S. Application Data

(63) Continuation of application No. 10/017,232, filed on Dec. 13, 2001, now Pat. No. 7,265,516.

(51) Int. Cl.
*H02P 21/00* (2006.01)
(52) U.S. Cl. .......................... 318/806; 388/801; 326/46
(58) Field of Classification Search ................. 318/806; 388/801; 326/46
See application file for complete search history.

(56) References Cited

U.S. PATENT DOCUMENTS

| | | | | |
|---|---|---|---|---|
| 4,002,959 A | 1/1977 | Schadlich et al. | ........... | 318/245 |
| 4,208,621 A | 6/1980 | Hipkins et al. | ............... | 318/138 |
| 4,389,990 A | 6/1983 | Murray | ........................ | 123/353 |
| 4,418,298 A | 11/1983 | Suzuki et al. | ................ | 318/341 |
| 4,427,931 A | 1/1984 | Tsukihashi | ................... | 318/317 |
| 4,481,448 A | 11/1984 | Bishop | ........................ | 318/248 |
| 4,511,829 A | 4/1985 | Wisniewski | ................. | 318/317 |
| 4,523,134 A | 6/1985 | Kinoshita et al. | ........... | 318/313 |
| 4,562,393 A | 12/1985 | Loyzim et al. | .............. | 318/599 |
| 4,583,028 A | 4/1986 | Angersbach et al. | ........ | 318/254 |
| 4,626,962 A | 12/1986 | Ahn et al. | ................... | 361/752 |
| 4,628,233 A | 12/1986 | Bradus | ........................ | 388/809 |
| 4,636,711 A | 1/1987 | Freymuth | .................... | 323/282 |
| 4,644,255 A | 2/1987 | Freymuth | .................... | 323/282 |
| 4,658,203 A | 4/1987 | Freymuth | .................... | 323/282 |
| 4,665,350 A | 5/1987 | Angi et al. | ................... | 318/254 |
| 4,749,922 A | 6/1988 | Hoppe et al. | ................. | 318/257 |
| 4,803,410 A | 2/1989 | Shinohara et al. | ........... | 318/331 |
| 4,804,894 A | 2/1989 | Machida et al. | | |
| 4,893,067 A | 1/1990 | Bhagwat et al. | ............. | 388/817 |

(Continued)

FOREIGN PATENT DOCUMENTS

EP    1320184 A2    6/2003

*Primary Examiner*—Bentsu Ro
*Assistant Examiner*—Erick Glass
(74) *Attorney, Agent, or Firm*—Haynes and Boone, LLP

(57) ABSTRACT

The invention relates to a method of, and system for, linear speed control for an electric motor, in which a digital to analog converter means is used for converting an 8-bit digital signal to an analog voltage for setting voltage across a motor, a digital state machine means is used for converting the duty cycle of an input signal for output to the digital to analog converter means, and a closed loop feedback loop means is used for monitoring and setting the voltage across the motor. An over-current sense circuit can be used for monitoring the current across the electric motor. An over/under voltage sense circuit can be used for monitoring voltage of the electric motor. The resulting 8-bit digital control signal is converted to an analog voltage for the electric motor. Such methods and systems find particular use in automotive applications.

19 Claims, 7 Drawing Sheets

U.S. PATENT DOCUMENTS

| | | | |
|---|---|---|---|
| 4,893,215 A | 1/1990 | Urushiwara et al. | 361/708 |
| 4,899,256 A | 2/1990 | Sway-Tin | 361/715 |
| 4,999,556 A | 3/1991 | Masters | 318/599 |
| 5,093,891 A | 3/1992 | Komiyama et al. | 388/813 |
| 5,159,516 A | 10/1992 | Fujihira | 361/18 |
| 5,200,676 A * | 4/1993 | Mueller et al. | 318/444 |
| 5,230,035 A | 7/1993 | Spring | 388/815 |
| 5,241,256 A | 8/1993 | Hatanaka et al. | |
| 5,285,146 A | 2/1994 | Pierret et al. | 322/25 |
| 5,315,458 A | 5/1994 | Sato et al. | |
| 5,329,238 A | 7/1994 | Hofsass et al. | 324/522 |
| 5,351,162 A | 9/1994 | Koishikawa | 361/18 |
| 5,363,024 A | 11/1994 | Hiratsuka et al. | 318/254 |
| 5,408,573 A | 4/1995 | Jamieson et al. | 388/815 |
| 5,486,747 A | 1/1996 | Welch | |
| 5,497,072 A | 3/1996 | LeComte et al. | 323/289 |
| 5,521,785 A | 5/1996 | Schmidt et al. | 361/720 |
| 5,592,058 A | 1/1997 | Archer et al. | 318/254 |
| 5,594,307 A | 1/1997 | Adachi | 318/280 |
| 5,612,629 A | 3/1997 | Mullin et al. | 324/772 |
| 5,657,194 A | 8/1997 | Waltz | 361/75 |
| 5,744,921 A | 4/1998 | Makaran | 318/254 |
| 5,747,956 A | 5/1998 | Lamm | 318/599 |
| 5,781,385 A | 7/1998 | Permuy | 361/30 |
| 5,886,486 A | 3/1999 | Jeong et al. | |
| 5,917,296 A | 6/1999 | Frey et al. | 318/268 |
| 5,934,398 A | 8/1999 | Hotta | 180/65.8 |
| 5,986,426 A | 11/1999 | Rowan | |
| 6,008,611 A | 12/1999 | Chen et al. | |
| 6,018,234 A | 1/2000 | de Savasse | 322/33 |
| 6,046,566 A | 4/2000 | Sonoda et al. | |
| 6,054,198 A | 4/2000 | Bunyan et al. | 361/704 |
| 6,064,931 A | 5/2000 | Sawada et al. | 701/41 |
| 6,137,418 A | 10/2000 | Zuercher et al. | 340/648 |
| 6,140,784 A | 10/2000 | Mazda | |
| 6,140,793 A | 10/2000 | Carr et al. | |
| 6,147,465 A | 11/2000 | Hollenbeck | 318/254 |
| 6,157,160 A | 12/2000 | Okawa et al. | |
| 6,158,545 A | 12/2000 | Kaji et al. | 180/446 |
| 6,160,372 A | 12/2000 | Cusack | 318/786 |
| 6,180,880 B1 | 1/2001 | Loibl et al. | 147/52.3 |
| 6,194,856 B1 | 2/2001 | Kobayashi et al. | 318/432 |
| 6,201,366 B1 | 3/2001 | Menegoli | 318/590 |
| 6,208,107 B1 | 3/2001 | Maske et al. | |
| 6,281,827 B1 | 8/2001 | Hsieh | 341/152 |
| 6,329,785 B1 | 12/2001 | Starkie et al. | 318/811 |
| 6,335,600 B1 | 1/2002 | Kasai et al. | 318/434 |
| 6,339,310 B1 | 1/2002 | Sugiyama et al. | |
| 6,392,372 B1 | 5/2002 | Mays, II | 318/254 |
| 6,400,163 B1 | 6/2002 | Melcher et al. | 324/713 |
| 6,404,607 B1 | 6/2002 | Burgess et al. | 361/58 |
| 6,469,916 B1 | 10/2002 | Kerkman et al. | |
| 6,525,533 B2 | 2/2003 | Morimoto et al. | 324/263 |
| 6,587,338 B2 | 7/2003 | LaCroix et al. | |
| 6,611,117 B1 | 8/2003 | Hardt | 318/254 |
| 6,693,400 B2 | 2/2004 | Pedrazzini et al. | |
| 6,737,827 B2 | 5/2004 | Cashatt | |
| 6,747,380 B2 | 6/2004 | Bernreuther et al. | 310/71 |
| 6,816,758 B2 | 11/2004 | Maxwell, Jr. et al. | |
| 6,917,169 B2 | 7/2005 | Nagasawa et al. | 318/280 |
| 2002/0084758 A1 | 7/2002 | Eroglu et al. | |
| 2002/0116100 A1 | 8/2002 | Shimazaki et al. | 701/22 |
| 2003/0057899 A1 | 3/2003 | LaCroix | 318/114 |
| 2003/0063900 A1 | 4/2003 | Wang et al. | 388/806 |

\* cited by examiner

LINEAR ELECTRIC MOTOR CONTROLLER AND SYSTEM FOR PROVIDING LINEAR CONTROL

CROSS-REFERENCE TO RELATED APPLICATIONS

This application is a continuation application of U.S. patent application Ser. No. 10/017,232, filed Dec. 13, 2001 now U.S. Pat. No. 7,265,516, now allowed. The entire contents of the prior pending application is hereby incorporated herein by express reference thereto.

FIELD OF THE INVENTION

The invention relates to a method of, and system for, providing linear control of electric motors. Specifically, the present invention is directed to a method of and system for linear control of variable speed electric motors, such as for use in automotive vehicles.

BACKGROUND OF THE INVENTION

The electrical systems for which many electronic controllers are presently designed are typically, such as in automobiles, 12 V or 24 V systems. The controllers are typically attached to the car dashboard, seat bottom, or the like by being screwed into place.

Control of present-day electric motors, such as those used in the heating ventilating and air conditioning (HVAC) systems of automobiles, has mainly been achieved using switch-mode technology, in which a fixed power supply is turned on or off as needed to control the speed of the electric motor. In the United States, this technology has been implemented primarily by use of a resistive divider or by pulse width modulation (PWM). A resistive divider operates by modulating the power provided to the electric motor by a constant or adjustable amount, resulting in a choppy or stepwise level of control.

PWM works by modulating the timing of the lead and trail edges of the power signal to the electric motor. PWM results in a relatively inaccurate control of an electric motor, and may also introduce a choppy quality of control.

Alternatively, some use has been made in Europe of a type of linear motor controller. A linear electric motor controller generally works by directly controlling the motor speed by setting the voltage of the power supplied to the electric motor. The speed of the electric motor has a linear relationship with the voltage of the power supplied to the motor, hence the term "linear." These systems are characterized by an undesirably large latency period, i.e., between detection and correction of the desired motor speed.

Also, some use has been made of analog variable-direct current (DC) voltage for control of variable speed electric motors, with a method that involves using a low-pass filter to generate the DC voltage. The low-pass filter used to generate the DC voltage to the motor introduces a stepwise/choppy quality to the control of the motor voltage, similar to the use of a resistive divider.

The widespread use of linear controllers for control of present-day variable speed electric motors, however, has been frustrated largely due to the large amount of heat generated by such controllers, and the difficulty thus encountered in practice when using such controllers. As an example, linear controllers may require heat dissipation ratings of 90-95 watts. Linear controllers used previously were designed so that the controller was remotely located from heat-sensitive structures, which tended to result in increased size of the controller module. The difficulty in cooling such linear controllers, thermal melting and breakdown of the material enclosing linear controller units, and a need for placement of the controller within a cooling air stream has limited the use of such controllers in practical applications.

On the other hand, PWM-type controllers require a heat dissipation rating of only 6-10 watts, which advantageously allows for the controller to be located adjacent to heat-sensitive components such as plastics. The housing of contemporary electric motor controller units, however, is typically made of standard injection-molded polypropylene plastics, which can handle close contact with 6-10 watts of heat dissipation as with a PWM-type controller, but not the 90-95 watts involved with linear controllers. Thus, switch-mode or PWM-type controllers tend to be highly desired for commercial production applications.

It would be desirable to overcome the various problems and disadvantages of both the heat-issues of linear control systems and the crude control of PWM-type controllers in the prior art to satisfy the design requirements for current electrical systems, in particular automotive systems.

SUMMARY OF THE INVENTION

The present invention now provides an electric motor controller that can be both smaller and lighter in weight than a switch-mode controller of the prior art. This can help increase fuel economy, decrease vehicle size, or increase the space available within the vehicle for other uses, as well as combinations thereof, all of which are highly desirable achievements. The invention also optionally, but preferably, packages the circuitry of the controller into an integrated circuit to further reduce the weight and size of the controller.

The controller includes an internal feedback mechanism to minimize control and monitoring latency, which provides for a more accurate control of the electric motor speed. This mechanism optionally, but preferably, incorporates a digital conversion to generate the motor voltage and current, thereby allowing for further increased accuracy compared to conventional low-pass filters.

The linear motor controller can also include a suitable heat sink, capable of conducting heat from the controller, wherein the heat sink is made of a material and designed so as to maximize the dissipation of heat from the controller. This enables the controller to be located in closer proximity to plastic components and/or a plastic housing, which also then allows for the controller module to be designed smaller if desired. The controller housing and plastic components are designed to be more capable of withstanding the increased wattage of heat dissipated by the controller, thereby also allowing for the controller to be placed in closer proximity to the plastic components and/or housing, thereby also contributing to reduction in size of the controller module. Additionally, the placement of the controller is preferably optimized within a cooling airflow so as to facilitate heat dissipation from the controller through the heat sink.

The invention relates to an automotive electric motor linear speed controller that includes a digital to analog converter means for converting an 8 bit digital signal to analog voltage for setting voltage across the electric motor, a digital state machine means for converting the duty cycle of an input signal for output to the digital to analog converter means, and a closed loop feedback loop means for monitoring and setting the voltage across the automotive motor. It is also advantageous to include an over-current sense circuit for monitoring the current across the electric motor, an over/under voltage sense circuit for monitoring a supply voltage to the electric controller, or both, although neither is strictly required.

Another embodiment of the invention relates to a circuit arrangement in a variable speed automotive electric motor controller. The circuit arrangement includes a controller logic circuit for operating a controller logic finite state machine, in which the state machine sets the voltage supplied to an electric motor. It can also include a closed loop feedback for generating a signal indicating the voltage across the electric motor, which can then be used for comparison to the voltage set by the state machine.

In another embodiment, the invention includes a system incorporating at least the above-described automotive electric motor linear speed control. In another embodiment, the invention includes a system for controlling the speed of an automotive electric motor, in which the voltage across the electric motor determines the speed of the electric motor. This system can include a digital to analog converter means for converting a digital signal to analog voltage for setting voltage across the electric motor, a microprocessor and associated digital memory for generating the digital signal, where the microprocessor is configured to instantiate and operate a digital state machine for converting the duty cycle of an input signal to the microprocessor and associated digital memory for setting the voltage supplied to the electric motor, and a closed loop feedback loop means for monitoring the voltage across the motor and generating a signal for input to the microprocessor. The invention also relates to an automobile including the above-described system. In a preferred embodiment, the system includes a temperature-control system.

In one preferred embodiment, the invention relates to a linear speed control for an automotive electric motor that includes a digital state machine for converting the duty cycle of an input signal generated by an associated closed loop feedback, an over-current sense circuit for monitoring the current across the electric motor, an over/under voltage sense circuit for monitoring a supply voltage to the electric controller, a digital to analog converter for converting an 8-bit digital signal to analog voltage for setting voltage across the electric motor, and a closed loop feedback loop for monitoring the voltage across the motor and generating a feedback signal for adjusting the voltage supplied to the motor.

The controller can also be packaged inside a controller module for ease of assembly into a final product, such as an automobile. Thus, the invention also relates to an electronic controller module including an electronic controller that generates at least about 15 W of heat, an enclosure made of at least one heat-resistant material configured and dimensioned to substantially surround and physically protect the controller, at least one electrically-conductive member to provide input or output of at least one electrical signal through the enclosure to the controller, and a heat sink operatively associated with the controller to receive heat therefrom, the heat sink being configured and dimensioned to dissipate a sufficient amount of heat to inhibit or avoid damage to the controller and enclosure.

In one embodiment, the enclosure includes a lid which comprises the heat sink. In a preferred embodiment, the lid is made of a heat-resistant material and the heat sink includes a heat fin assembly mounted upon the lid that extends away therefrom. A portion of the heat sink can extend through the lid to a position adjacent the controller to facilitate heat dissipation. In one embodiment, the heat sink is made of a material that dissipates about 20 W to 150 W. The heat sink material can include any suitable thermally conductive material, including aluminum, copper, thermally conductive plastic(s), or a combination thereof. The heat-resistant material does not melt on exposure to about 150 W and typically includes an olefinic polymer, preferably one that includes amide units. In a preferred embodiment, the olefinic polymer includes a polyamide-polypropylene copolymer and includes a filler in an amount sufficient to increase the heat-resistance thereof. Preferably, the filler includes talc, glass, ceramic, mica, silicate, clay, aramid, lithopone, silicon carbide, diatomaceous earth, carbonates, metal or an alloy or oxide thereof, particulate carbonaceous material, hard particulate material, or combinations thereof. The filler can be present in any form, preferably whiskers, fibers, strands, or hollow or solid microspheres.

In a preferred embodiment, the electronic controller is a linear controller capable of facilitating temperature control in an environment. Preferably, the enclosure is at least substantially rectangular. For example, the enclosure can have dimensions of about 3 cm to 8 cm in length, about 1 cm to 4 cm in height, and about 3 cm to 6 cm in width. As another example, the heat sink includes at least two short fins having a length of about 0.25 cm to 1 cm and at least two long fins having a length of about 1.5 cm to 6 cm, each adjacent the enclosure at one end thereof and extending away therefrom. Preferably, the at least two long fins include a first heat fin having a length of about 1.75 cm to 2.25 cm and a second heat fin having a length of about 3.5 cm to 4.5 cm.

In one embodiment, the lid and the enclosure are operatively associated via a plurality of projections and gaps to permit the lid to securely snap into place against the enclosure so as to collectively completely surround the electrical controller. In a preferred embodiment, the module further includes an insulating member between the controller and the lid and in contact therewith to inhibit or avoid thermal degradation of the controller. Preferably, the insulating member can include at least one silicone material that is sufficiently flexible to at least partially conform to the controller. In another preferred embodiment, a thermal grout is included in the module and is disposed to facilitate the lid and the heat-resistant material being at least water-resistant.

In one preferred embodiment, the controller includes a single circuit board having all controller components mounted thereon that is surrounded by the enclosure and the lid.

The invention also relates to a method for dissipating heat from an electronic controller by providing an enclosure around the electronic controller which generates at least about 15 W of heat during operation, associating a heat sink with the controller to receive heat therefrom, and dissipating a sufficient amount of heat to inhibit or avoid damage to the controller and enclosure. In one embodiment, the controller generates at least about 20 W to 150 W during operation. In another embodiment, at least about 90 percent of the heat generated is dissipated via the heat sink.

BRIEF DESCRIPTION OF DRAWINGS

The purpose and advantages of the present invention will be set forth in and apparent from the description that follows, as well as by practice of the invention. Additional advantages of the invention will be realized and attained by the methods and systems particularly pointed out in the written description and claims hereof, as well as from the appended drawings, wherein FIGS. 1A and 1B, which are collectively referred to herein as FIG. 1, are, collectively, a block diagram of a linear controller integrated circuit in accordance with a preferred embodiment of the current invention;

DETAILED DESCRIPTION OF THE PREFERRED EMBODIMENTS

Figure 1A:
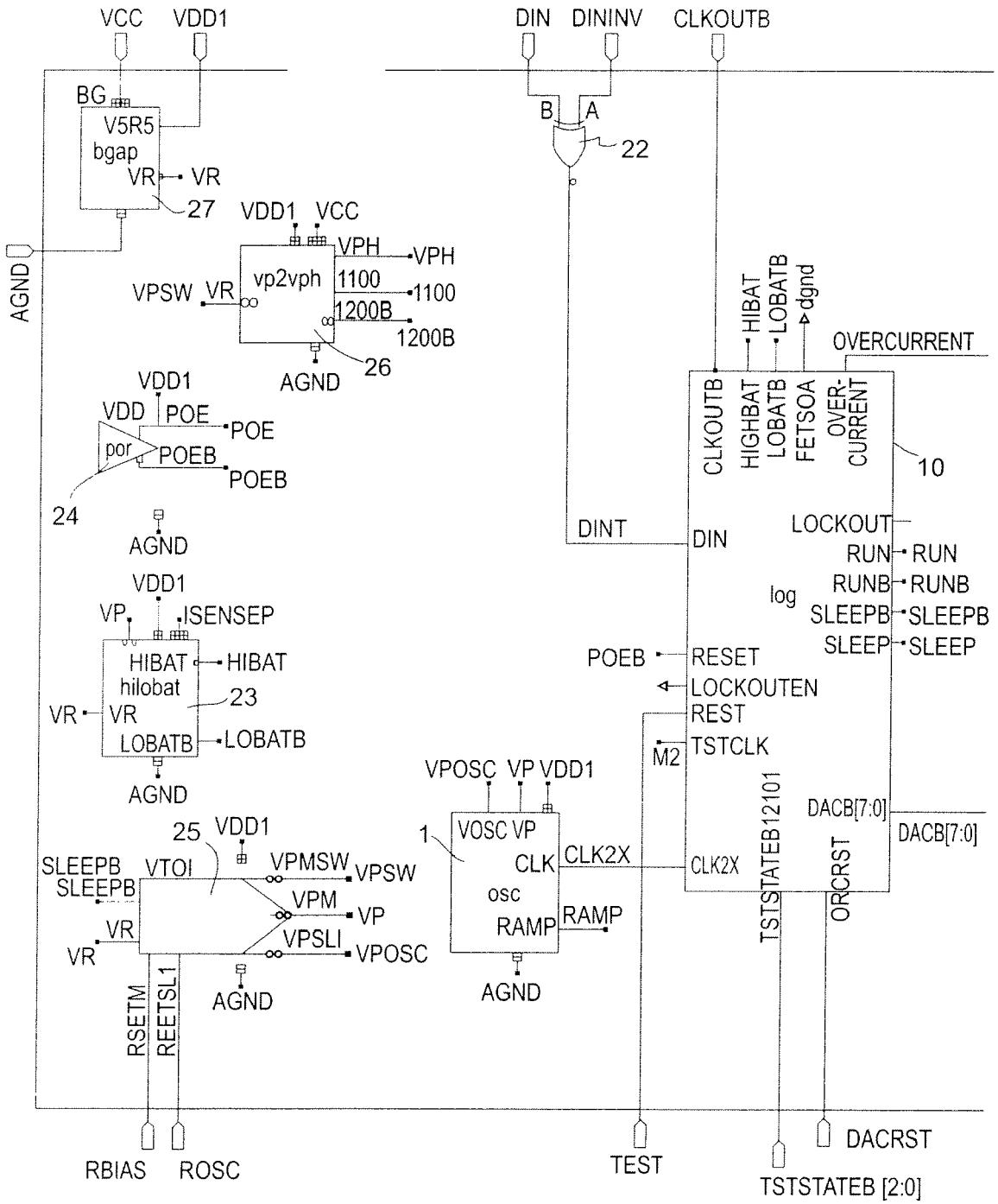

In accordance with a preferred embodiment of the invention, a method and system is provided to enable a linear electric motor controller that is smaller, lighter in weight, or both, compared to switch-mode controllers of the prior art. By packaging the linear controller of an embodiment of the current invention in an integrated circuit, additional weight and/or size savings can be realized. It has now been discovered that such linear controllers can be prepared by advantageously including an internal feedback mechanism to monitor the voltage and thus speed of the controlled motor, which can provide superior control compared to the switch mode, or PWM, type controller. The inclusion of at least one internal feedback mechanism facilitates a decreased latency between detection and correction of deviations of the controlled electric motor speed. This can advantageously minimize control latency to facilitate more accurate control of the electric motor speed.

In one embodiment, an internal feedback that incorporates a digital conversion to generate the motor voltage and current can be used, thereby allowing for further increased accuracy and smoothness of control over the use of low-pass filters of the prior art.

It should be understood that the linear motor controller can be used or adapted for a variety of suitable applications, including control of electric motors, electric lights, and the like. In particular, the linear motor controller of the invention is specifically directed to its use in controlling electric motors in automotive systems, preferably automobile HVAC systems.

Preferably, the linear controller of the invention is disposed on a single circuit board having all controller components mounted thereon.

The integrated circuit block diagram of FIG. 1 specified below serves to realize the linear power module and control method according to an embodiment of the invention.

The oscillator OSC 1 generates the 50% duty cycle used by the digital logic block 10. The clock frequency of the oscillator is about 150 kHz+/−10%. A digital state machine means s realized in the digital logic block 10 of the linear integrated circuit controller. Other methods employing similar state machines to that described herein may be used as is well known to those of ordinary skill in the art.

The closed loop feedback means of the current invention is embodied by operational amplifier OPA1 16, and operational amplifier OPA3 14, in conjunction with a compensation loop. OPA1 16 is used as a differential amplifier. It divides the input voltage by a constant value that is determined RDIF5/RDIF6 3 and resistors RDIF1/RDIF2 4. It defines the voltage across the motor—load CLP 18, which is then low pass filtered. The output of the low pass filter is then connected via a resistor to the input of the error amplifier OPA3 14. OPA3 14 serves as the error amplifier and gate driver. In the case of an overcurrent, the gate drive is altered to maintain a fixed load current. After a set period of time, the output of the gate driver is set to 0 volts.

The system transfer function CLP 18 may also be altered to allow for better matching to optimize performance of the monitor and control of the electric motor. The controller has the capability to operate with a ground offset of about +/−2 volts. Also, the transfer function can be inverted if desired, and the slope and position of the transfer function can be modified within limits.

The closed loop feedback 29 circuit monitors the voltage directly across the electric motor. The voltage is fed back into the controller integrated circuit and compared to the reference voltage generated by the digital to analog converter, DAC block 12. Based on the difference, the loop changes the gate drive voltage using a field effect transistor (FET) controlling the voltage across the motor so as to eliminate the difference. This closed feedback loop makes it possible to keep the voltage across the motor constant under varying loads and supply voltages. It also functions with optimal speed and smoothness.

The digital-to-analog converter means for converting the 8-bit duty cycle information from the digital logic block 10 into an analog signal is provided by the DAC block 12 and associated circuitry. This circuit converts the 8-bit digital signal into voltage VO 19. It is this voltage that sets the reference that determines the voltage across the motor. The output of this circuit is coupled with a capacitor 28 to ground which provides low pass filtering and prevents the reference voltage from changing too quickly. This is important since the duty cycle is calculated on every cycle. The output of the DAC block 12 is VO 19 (100%-duty cycle).

The ISENSE block 20 forms a part of the compensation loop of the closed loop feedback means, and also functions as over-current and over/under-voltage circuits for monitoring the current and voltage supplied to the electric controller. It functions by limiting or shutting down the output current in the motor. In order to measure the current, the ISENSE block 20 measures the voltage across a shunt 1 mΩ resistor (part of ISENSE block 20). Thus, 1 mV is equivalent to 1 Amp. Other size resistors could be suitably substituted, with a corresponding change in voltage and current. The ISENSE block 20 compensates for the variation of the shunt copper resistor over a temperature range. The circuit is designed to provide a variable threshold of over-current. The actual value of the over-current is determined by the input signal. The lower the voltage across the motor, the lower the over-current threshold. The over-current threshold is broken down into 4 levels in the depicted embodiment.

The over/under voltage circuit compares the system voltage to preset references. One reference is for an over-voltage condition, the other reference is for an under-voltage condition. In either case, if the system voltage goes outside of the normal operation conditions, this circuit signals the state machine of the digital logic block 10 to turn the output off. The over/under voltage circuit has a small amount of hysteresis at each threshold to prevent unwanted oscillations.

The DIN block 22 takes the external pulse width modulated signal and level shifts it to a level compatible with the digital logic block 10.

The POR block 24 resets the digital logic block 10 if the VDD1 (input power) is below about 4.8V.

The VTO1 block 25 and VP2VPH block 26 use accurate and stable voltage references to create accurate and stable current references.

The BGAP block 27 includes a bandgap reference and a regulator. They can provide internal temperature stable voltage references.

The HILOBAT block 23 senses the battery voltage and sends an overvoltage or an undervoltage conditional to the digital logic block 10, should the battery voltage be above approximately 17 volts or below approximately 8 volts, respectively.

Figure 2:
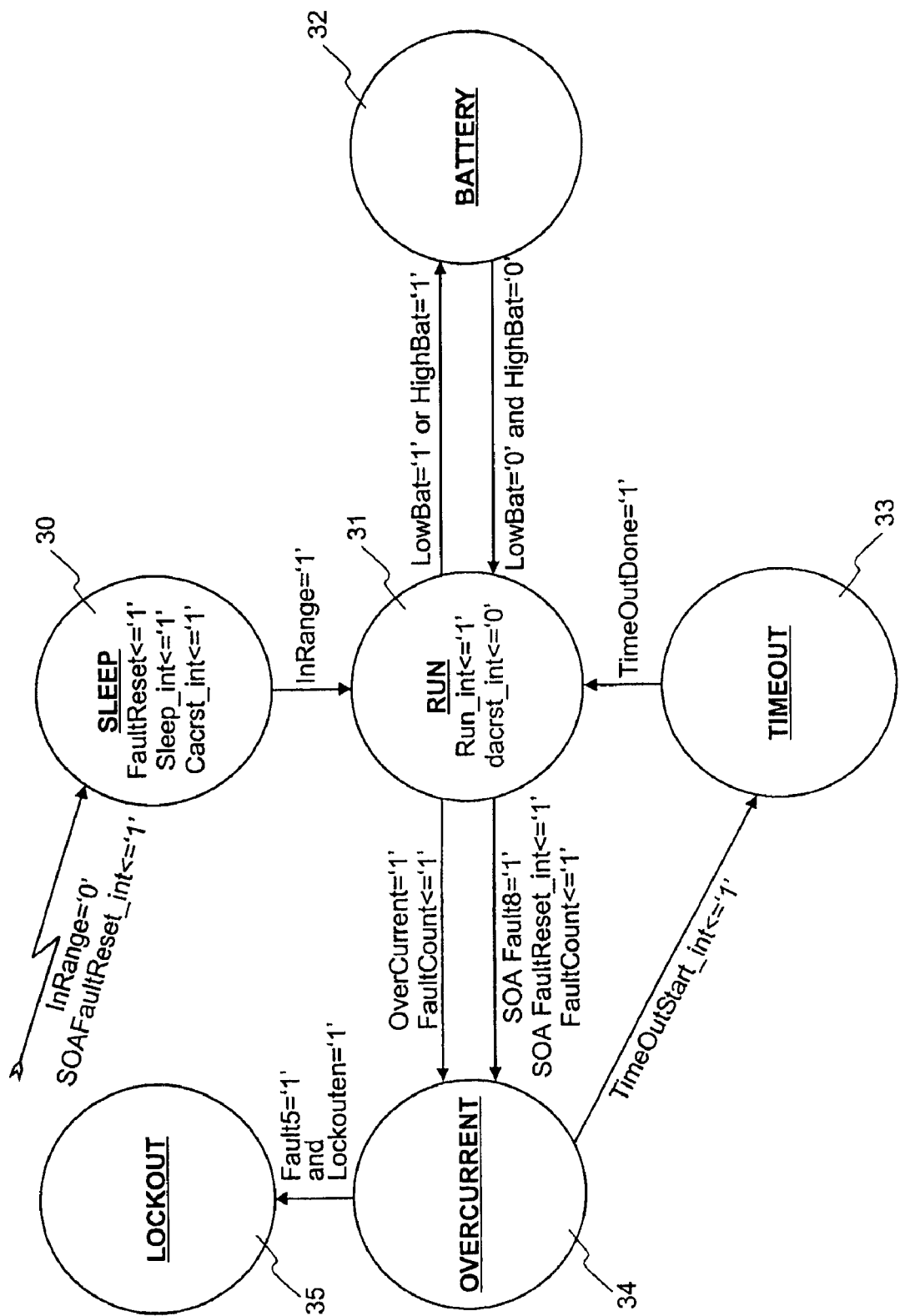
FIG. 2 is a finite state machine diagram of controller logic used in a preferred embodiment of the current invention.

FIG. 2 is a finite state machine diagram of the digital logic block 10 in a preferred embodiment of the current invention. The finite state machine performs the function of converting the duty cycle of the input signal and determining the state of at least one linear power module. The duty cycle can be determined by comparing the value of one counter to another. The first counter typically keeps track of the time that the input signal is in a low condition. The second counter typically keeps track of the period of the input signal. Usually, the first counter is divided by the second counter once every cycle, and the result is an 8-bit value that can be passed on to the digital to analog converter. Since the counters are greater than 8-bits (16-bits), the linear motor controller can determine the duty cycle over a wide range of input frequencies.

The controller also optionally but preferably includes guard bands at each end of the duty cycle scale. After the duty cycle is calculated, the result can be compared to see if it falls into either of the optional guard bands. If so, the state machine can command the output to be off if desired. The purpose of the guard bands, when present, is typically to cause the controller to enter a fail-safe mode when the input is shorted to battery or to ground. This can facilitate protection of the sensitive and/or expensive electronic circuitry and prevent it from being damaged.

The state machine is also responsible for the control of the output when an over current situation is detected. When an over current situation is detected for longer than a predetermined time, the state machine can turn the output off for approximately one second, and then turn the output back on to the level that the input line is signaling. If the fault is still present, the controller can repeat the same procedure. This can be arranged to continue until either the fault is removed or the unit is turned off by the operator to conduct diagnostics or repairs.

When the input signal indicates that the electric motor should be off, the state machine can put the controller into a sleep mode until a valid input signal is applied.

The state machine of a preferred embodiment has six states and the signal lines and logic which cause state changes. The precise states, signal lines, and logic describing the state transitions may vary in a given embodiment, as is understood in the art. The description of these items for a preferred embodiment is not intended to limit the invention, but rather to be exemplary in nature.

Figure 1B:
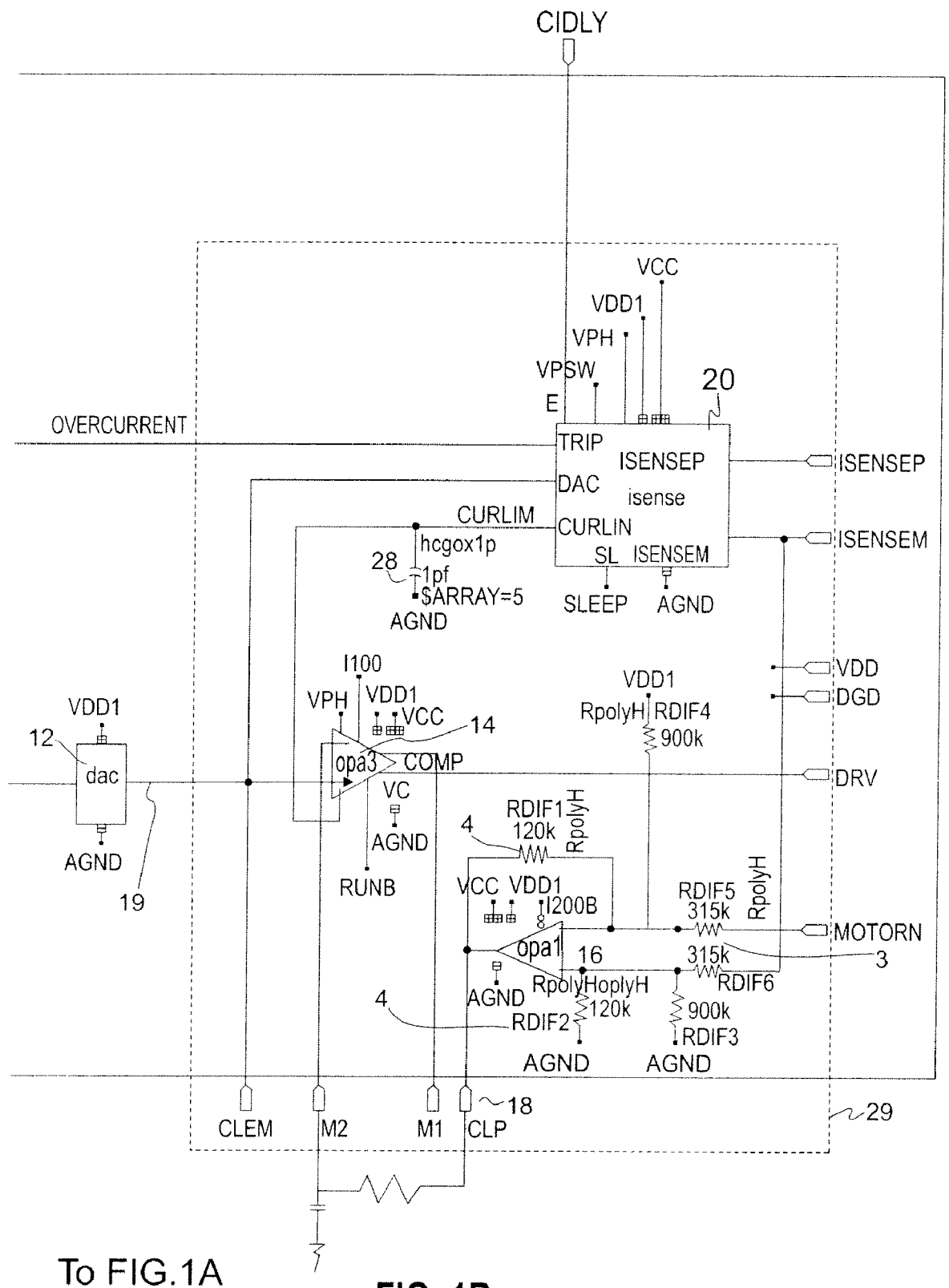

The state machine is typically instantiated and controlled by the controller integrated circuit, as the digital logic block 10 of FIG. 1. As is well known in the art, the use of such an integrated circuit can also be accomplished by other means, including but not limited to the use of a general-purpose microprocessor and associated memory that are properly configured.

The signal lines used by the state machine include registers that contain either binary or other data. A binary signal line has a value of either a '0' or a '1.' A non-binary signal may contain any value that can be stored in the register. These signals have both a default value, which is used on power up, and a reset value, which is used upon a reset. The default and reset values are not always the same. In a preferred embodiment, the various signals and registers used to control the state machine and their power-on default and reset values are given in the following table.

TABLE 1

State Machine Signals and Defaults

| SIGNAL | DEFAULT | RESET |
|---|---|---|
| FaultCount | '0' | |
| FaultReset | '0' | |
| Lockout | '0' | '0' |
| Run | '0' | '0' |
| SOAFaultReset | '0' | '1' |
| Sleep | '0' | '1' |
| State | Current State | |
| TimeOutStart | '0' | '0' |
| dacrst | '0' | '0' |

"State" is a register value and is updated to contain the current state of the state machine, so no reset value is needed. FaultCount and FaultReset are used to track and signal a reset condition, so they have no given reset value.

The controller typically operates on any suitable duty cycle, such as from about 15 to 150 Hz. Preferably, the duty cycle can be about 35 Hz with a precision of about 0.4%. The InRange signal is set to '1' if the duty cycle is from about 5% and 95%. The InRange signal is set to '0' if the duty cycle falls outside this range.

By default, the system powers on in SLEEP state 30, waiting for a valid PWM input. Whenever the controller receives a power on reset or an InRange='0' condition, it returns back to the SLEEP state 30. Also, if the InRange line is '0' and the SOAFaultReset line is '0,' the state is set to the SLEEP state 30.

The SLEEP state 30 remains valid and current while the FaultReset line is '0,' the Sleep line is '0,' and the cacrst line is '1.' If the InRange line is set to '1' while in the SLEEP state 30, the controller logic shifts to the RUN state 31. RUN state 31 is the normal mode of operation, and the controller logic will remain in this state so long as the Run interrupt signal line is '0' and the dacrst interrupt signal line is '1,' so long as another state change is not caused by other signal lines. It is in the RUN state 31 that the state machine allows the controller circuits to control the output.

Should a battery problem occur, the Hilobat analog block the sets either the LowBat or HighBat line to '1'. If this occurs while in the RUN state 31, it will cause the controller logic to change to the BATTERY state 32. The HighBat and LowBat signal lines are latched. This helps to prevent false readings from transient events.

While in the BATTERY state 32, if both the LowBat and HighBat lines are again '0,' the controller logic will change back to the RUN state 31. The LowBat signal line is set when a low battery condition is detected. An overcharged battery causes the HighBat signal line to be set. When a battery overcharge or undercharge condition is corrected, the relevant signal lines is reset, and the state is changed to RUN state 31. A potential oscillation can be prevented by the hysteresis in the Hilobat block.

Detection of an over current state causes the OverCurrent signal line to be set to '1' and changes the current state to OVERCURRENT state 34. The OverCurrent signal line is latched to prevent erroneous detection of the over-current condition. If the state machine is in OVERCURRENT state 34, and the Fault 5 signal line is '1' (indicating that the over-current condition has occurred a predetermined maximum number of times), and the Lockout signal line is '1' (indicating that lockout is enabled), the state machine will change to the LOCKOUT state 35. While in the LOCKOUT state 35, the controller can be arranged so it will not operate unless the power is cycled or a reset is signaled.

While in the OVERCURRENT state 34, after a specified period of time, a timeout will be signaled via the TimeOut-Start interrupt line. This causes the state machine to shift to the TIMEOUT state 33 until the timeout is complete, at which time the TimeOutDone signal line is set to '1' and the state machine returns the RUN state 31. The TIMEOUT-COUNTER block is used to create a delay of approximately 1 second after an over current problem is detected.

Thus, the digital state machine, over-current sense circuit, under/over voltage sense circuit, digital to analog converter, and closed loop feedback circuit, when optionally but preferably all used in combination, include functional blocks of a custom integrated circuit that performs the functions of the linear power controller module of the current invention. Of these, the functionality of the state machine, digital to analog converter, and closed loop feedback circuit are essential to an embodiment of the current invention.

Figure 3:
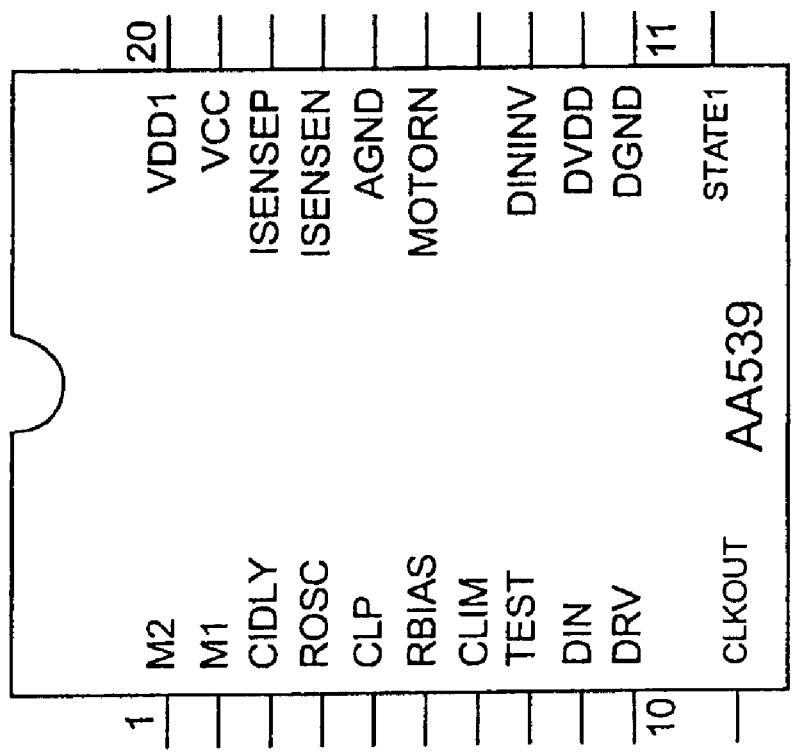
FIG. 3 is a block diagram depicting the pinouts associated with the controller integrated circuit of an embodiment of the current invention.

FIG. 3 depicts the physical and logical arrangement of the pinouts and associated analog circuitry of the controller integrated circuit of an embodiment of the current invention. The actual signals, pinouts and physical packaging of a controller integrated circuit may, of course, be modified by methods well known to those of ordinary skill in the art. The signals and their associated pin numbers of the controller integrated circuit of the embodiment herein described are given for exemplary purposes as follows.

TABLE 2

Pin assignments of the Motor Controller Integrated Circuit

| SIGNAL | PIN | BRIEF DESCRIPTION |
|---|---|---|
| M2 | 1 | Input to the -ve input of OPA3. Connected to CLP as part of the closed loop feedback. |
| M1 | 2 | Connected to the output of OPA3 and is capacitively connected to M2 to provide stability and prevent oscillations. |
| CIDLY | 3 | Connected to a capacitor. Capacitor value determines the time delay before the circuit can detect an overcurrent state. Provides a time delay to prevent false triggering of the overcurrent detection circuitry. |
| ROSC | 4 | Connected to Ground through a resistor which sets the oscillator bias which determines the oscillator frequency. |
| CLP | 5 | The output of OPA3 14 and is capacitively connected to M2 to provide stability and prevent oscillations. |
| RBIAS | 6 | Connected to GROUND through a resistor. the resistor value determines the BIAS current of the ASIC to ensure proper operation. |
| CLIM | 7 | Connected to GROUND through a capacitor. The value of the capacitor determines the "slew" rate regarding the change of the output voltage across the motor. |
| TEST | 8 | A special pin used by the manufacturer to test the integrated circuit. Left "open" or unconnected in the circuit in normal use. |
| DIN | 9 | Input pin that the control signal is applied to. |
| DRV | 10 | Output that supplies the appropriate voltage to the gate of the FET for a given voltage across the motor. |
| DGND | 11 | The GROUND connection for the digital circuitry on the ASIC. |
| DVDD | 12 | Connected to the 5 volt bus for the digital circuitry on the ASIC and provides a connection for a bypass capacitor to ensure proper operation. |
| DININV | 13 | Used to determine the polarity of the input signal. If connected to DVDD the polarity is positive, if |

TABLE 2-continued

Pin assignments of the Motor Controller Integrated Circuit

| SIGNAL | PIN | BRIEF DESCRIPTION |
|---|---|---|
| | | connected to GROUND the polarity is negative. |
| MOTORN | 15 | Connected to the negative side of the motor. It is the input that is used to feedback the voltage across the motor to ensure the proper value of the voltage across the motor. |
| AGND | 16 | The GROUND connection for the analog circuitry inside the ASIC. |
| ISENSEN | 17 | Connected to the negative side of the shunt and used to monitor the current flowing through the load. |
| ISENSEP | 18 | Connected to the positive side of the shunt and used with ISENSEN to monitor the current flowing through the load. |
| VCC | 19 | Connected to the positive side of the voltage system through a resistor. This is the positive voltage connection of the ASIC. |
| VDD1 | 20 | Connected to the 5 volt bus of the analog circuitry on the ASIC. Also provides a connection to a bypass capacitor to ensure proper operation. |

Pin 14 is not connected.

The linear electronic controller of the invention is typically packaged in a module to protect the circuitry during transport, assembly into a final end product, and use thereof. The module includes a casing to protect the circuitry and facilitate transport, assembly, and use, and includes a suitable heat sink to dissipate sufficient heat to inhibit or avoid degradation of the efficiency of the controller and the module itself. Preferably, the module casing, also referred to herein as the enclosure, includes materials designed to withstand the high temperatures generated by the linear controller. It is additionally advantageous to optimize the placement of the controller in an embodiment so as to facilitate heat dissipation. This is facilitated by placement of the controller in an air stream, such as an HVAC system in which it can be employed.

The present invention can provide one or more of the following benefits. The module of the invention including the linear electronic controller can be smaller than conventional automotive controller modules, which can advantageously permit placement of the module in a wider variety of locations. For example, HVAC electronic controllers can be disposed within the airflow in an increased number of locations between the intake vent(s) and the vent(s) to the passenger compartment.

The module of the invention is an enclosure that at least substantially surrounds the electronic controller, and in one preferred embodiment it is at least substantially rectangular. Preferably, the enclosure completely surrounds the controller except for any electrically conductive members or holes of less than 2 mm for additional cooling that exist therein. In one preferred embodiment, the enclosure includes a lid. In one more preferred embodiment, the lid is made of a heat-resistant material and the heat sink comprises a heat fin assembly mounted upon the lid that extends away therefrom. In another more preferred embodiment, the lid is the heat sink.

The lid and remainder of the enclosure are operatively associated to surround the controller circuitry. In one embodiment, this operative association includes a plurality of projections and recesses on the lid and remainder of the enclosure so they can snap together. The modules of the invention can typically be at least about 25%, preferably at least about 33% smaller than conventional electronic controller modules. In one preferred embodiment, the modules can be at least about 50% smaller than conventional modules. Conventional controller modules are typically at least 9 cm long×4.75 cm across×2 cm in height, not including any appendages for mounting or any heat fins attached thereto. Size can refer to either the footprint area or the volume, or both. A rectangular module typically has a length of about 3 cm to 12 cm, preferably about 4 cm to 8 cm. In one preferred embodiment, the length is about 4.5 cm to 7 cm, while in another preferred embodiment it is about 5 cm to 6.5 cm. The width of such a rectangular module can, in one embodiment, be from about 3 cm to 7 cm, preferably from about 3.5 cm to 5 cm, while the height can be from about 1 cm to 4 cm, preferably from about 1.5 cm to 2.5 cm. For example, the module can be 6 cm long×4.75 cm across×2 cm high, which is a 33% size reduction in footprint area compared to the conventional size module described above.

The modules are preferably sized sufficiently to increase the placement options thereof, particularly when used in an air flow for HVAC control. For example, a conventional 9 cm long module has a certain number of places in which it can be disposed in the airflow of an HVAC system it is designed to control, but a 6 cm long module with otherwise identical size characteristics will have a greater number of suitable placement locations. Preferably, the modules of the invention are snapped into place in the desired system being electronically controlled, but they can alternatively or additionally use screws, clasps, brackets, nails, or any other suitable fastener to be secured. One desired location for HVAC electronic controllers is in the airflow being controlled. In particular, the modules can be disposed within 10 cm of the fan blades or motor used to move the airflow. The controller module can also have one or more tabs, or mounting areas, integrally formed therewith to use in facilitating mounting of the module for the desired end-use. These tabs can extend away from the module in any direction, but in one preferred embodiment, they extend away in the same direction as the length of the module.

The module of the invention is typically lighter weight than conventional modules due to improved electronic design, use of circuit boards, less material in the smaller modules, and the like. This can reduce repetitive motion injuries in assembly personnel. More importantly, this can reduce the overall weight of the automotive vehicle, thereby providing improved fuel efficiency. Such modules can have their weight reduced by at least about 10 weight percent, preferably by at least about 20 weight percent according to the invention. The modules of the invention produce less noise and heat than conventional controller packages, as well as providing increased durability. The improved design includes various features such as use of an integrated chip instead of various off-the-shelf components or even the footprint or volume size reduction of the module, which reduces weight both in the smaller circuit board and the smaller module casing.

Advantageously, the electronic controllers and modules of the invention can operate in various types of automotive electrical systems, including conventional systems and even 42 V systems. The controllers of the invention can be used in any suitable automotive application, including HVAC, motor control, lighting, or the like, or combinations thereof. In one preferred embodiment, the electronic controllers are blowout-resistant or blowout-proof, such that the electrical system has minimized or avoids damage when the car is jump-started improperly.

The module casing of the invention is typically an enclosure formed of a material, which in one preferred embodiment is non-conductive, that is sufficiently heat-resistant to inhibit or prevent melting thereof under normal operating conditions of the electronic controller therein. At least one electrically-conductive member is typically present to provide input or output of at least one electrical signal through the enclosure to the controller. The member can include a plurality of terminals, wire connections, or the like, or combinations thereof. Preferably, the enclosure is formed of a heat-resistant plastic that will not melt or lose structural integrity when the controller is operated in an 85° C. atmosphere while dissipating at least about 15 W to 150 W. In one preferred embodiment, the module material is capable of withstanding operation at extremely low temperatures on the order of −40° C., as well. Testing showed that the modules of the invention survived at least 1000 cycles of normal operation at these temperature extremes. The heat-resistant plastic preferably includes an olefinic polymer, particularly one including amide units. Preferably, a polyamide-polypropylene copolymer blend is included in forming the enclosure. In a preferred embodiment, the polyamide includes nylon units or is entirely nylon. An exemplary module material includes a nylon-polypropylene blend.

More preferably, the enclosure of the module includes a mineral filler, such as talc, glass, mica, precipitated hydrated silica or other silicates, such as calcium silicates; clay; ceramic; aramid; lithopone; silicon carbide; diatomaceous earth; carbonates such as calcium carbonate and magnesium carbonate; metals such as titanium, tungsten, aluminum, bismuth, nickel, molybdenum, iron, copper, boron, cobalt, beryllium, zinc, and tin; metal alloys such as steel, brass, bronze, boron carbide, and tungsten carbide, metal oxides such as zinc oxide, iron oxide, aluminum oxide, titanium oxide, magnesium oxide, and zirconium oxide; particulate carbonaceous materials such as graphite, carbon black, and natural bitumen; fly ash; or a hard particulate material as noted below, or the like, or combinations thereof. Each filler may be included as noted above, or in the form of whiskers, fibers, strands, or hollow or solid microspheres, or the like, or in a combination thereof. Preferably, the filler includes talc, mica, or glass in some form. In one embodiment, fibers are preferred.

"Hard particulate materials," as defined herein, for optional use in the material of the invention include, but are not limited to: Actinolite; Aegirine; Akermanite; Almandine; Analcite; Anatase; Andalusite; Andesine; Andradite; Anorthite; Anorthoclase; Anthophyllite; Apatite; Arsenopyrite; Augelite; Augite; Axinite; Baddeleyite; Benitoite; Bertrandite; Beryl; Beryllonite; Bixbyite; Boracite; Braunite; Bravoite; Breithauptite; Brookite; Cancrinite; Cassiterite; Celsian; Chloritoid; Chondrodite; Chromite; Chrysoberyl; Clinozoisite; Cobaltite; Columbite; Cordierite; Cordundum; Cristobalite; Cummingtonite; Danburite; Datolite; Derbylite; Diamond; Diaspore; Diopside; Dioptase; Enstatite; Epidote; Euclasite; Eudialite; Euxenite; Fayalite; Fergussonite; Forsterite; Franklinite; Gahnite; Gehlenite; Geikielite; Glaucophane; Goethite; Grossularite; Hambergite; Hausmannite; Haüyne; Hendenbergite; Helvite; Hematite; Hemimorphite; Hercynite; Herderite; Hornblende; Humite; Hydrogrossularite; Ilmenite; Jadeite; Kaliophyllite; Kyanite; Lawsonite; Lazulite; Lazurite; Lepidocrocite; Leucite; Loellingite; Manganosite; Marcasite; Marialite; Meionite; Melilite; Mesolite; Microcline; Microlite; Monticellite; Nepheline; Niccolite; Nosean; Oligoclase; Olivine; Opal; Orthoclase; Orthopyroxene; Periclase; Pekovskite; Petalite; Phenakite; Piemontite; Pigeonite; Pollucite; Prehnite; Pseudobrookite; Psilomelane; Pumpellyite; Pyrite; Pyrochlore; Pyrolusite; Pyrope; Quartz; Rammelsbergite; Rhodonite; Rutile; Samarskite; Sapphirine; Scapolite; Silica; Sodalite; Sperrylite; Spessartite; Sphene; Spinel; Spodumene; Staurolite; Stibiotantalite; Tantalite;

Tapiolite; Thomsonite; Thorianite (R); Topaz; Tourmaline; Tremolite; Tridymite; Ullmannite; Uraninite (R); Uvarovite; Vesuvianite; Wagernite; Willemite; Zircon; and Zoisite; and combinations thereof, as named in the table "Physical Constants of Minerals" from the *CRC HANDBOOK OF CHEMISTRY & PHYSICS, 52ND EDITION* 1971-1972 (*P.* 193-197) *THE CHEMICAL RUBBER CO., CLEVELAND, OHIO.*

The module preferably includes a nylon-polypropylene blend that is glass-filled, preferably with glass fibers. An exemplary glass-filled nylon-polypropylene blend used to form the module casing includes the GAPEX class of materials, commercially available from Ferro Corp. of Cleveland, Ohio.

The module includes a heat sink, which can be a heat fin portion attached to the module casing, a metal lid forming a portion or all of at least one side of the module casing, or both. Other suitable heat sinks may be envisioned and used. The heat sink typically includes a heat fin assembly mounted upon the lid that extends away therefrom. In one embodiment, a portion of the heat sink extends through the lid into the enclosure and adjacent the controller. When a heat fin is used, any suitable shape for dissipating the heat produced by the electronic controller of the invention can be used. The heat fin can be cast or extruded, for example, but in one embodiment it is preferably extruded. For example, an extruded heat fin having two protrusions spaced about 0.75 cm to 1.25 cm apart with one being about 3.5 to 4.5 cm long and the other being about 1.5 cm to 2.5 long can be used. Alternatively, a heat fin with an alternating pattern of 3 small fins and 2 long fins as noted above can be used. The small fins can have a height of about 0.25 cm to 0.75 cm. Without being bound by theory, it is believed that the extrusion of the fin provides an improved grain structure that provides for more desired thermal performance in connection with the invention.

Any sufficiently conductive material can be used for the heat sink or heat fin assembly so long as it can dissipate at least about 15 W to 150 W, preferably about 20 W to 100 W. Typically, the heat fin assembly on the module of the invention should be able to dissipate the about 85 W to 95 W that the electronic controllers disclosed herein typically produce, and any suitable material can be used. Preferred fin materials include, for example, aluminum, copper, thermally conductive plastics, and any combinations thereof. When a lid forming at least a portion of one or more sides of the module casing is used, it is preferred that a sufficiently thermally conductive lid be used that forms an entire side of the module casing. It is also preferred that the lid snaps or otherwise connects directly to the remaining module casing, which can be made of heat-resistant plastic. Again, aluminum, copper, and thermally conductive plastic(s), or combinations thereof, are among the preferred thermally conductive materials for the lid. Protective coatings can be applied if needed to inhibit or avoid oxidation, such as rust, or other forms of degradation typical in the environment in which the controller will be used.

The heat sink preferably does not directly contact the electronic controller circuitry, particularly the transistor component(s), since electrical contact therebetween would likely damage some or all of the circuitry. A gap therefore typically exists between the circuitry and the heat sink. It is preferred to use an electrically insulating and thermally isolating material between at least the transistor component of the circuitry and the heat sink. Preferably, the electrically insulating material is in contact with a portion of both the heat sink and the controller. While any suitable electrically insulating material can be used, including silicone grease, mica wafers, SIL-PAD glass-epoxy materials, and the like, it is preferred that the electrically insulating material includes one or more dry silicone-based materials, i.e., non-greases. Preferably, at least one filler material is included in the silicone-based materials, and any of the other fillers disclosed herein may be used for such purpose. In particular, the SARCON class of silicones commercially available from FUJIPOLY of Carteret, N.J. are preferred. Exemplary SARCONs include GRI, GRM, and GRN, or combinations thereof. The insulating material can be used in sheet form, and is preferably pre-cut in the shape of small squares that can be pulled off a backing and placed in the module to thermally isolate the desired circuitry and heat sink. Preferably, the insulating material is soft and pliable so that it at least partially conforms to the shape of the adjacent circuitry and heat sink, particularly when the modular casing is closed to trap the insulating material therebetween. The electrically insulating, but thermally conductive, material typically has a thickness of about 0.25 mm to 5 mm. In one preferred embodiment, the thickness is from about 0.5 to 1.5 mm.

It is critical that the module be at least water-resistant, and preferably waterproof, to avoid short circuits or other electrical problems or dangers when moisture is present in the airflow around the module or on nearby surfaces. For example, water from the air may condense on a nearby surface and drip onto the module. Thus, a water-resistant or waterproof seal is desired because any water that enters the module casing may compromise the electrical circuitry. When the heat sink is a heat-fin rather than a metal lid, a sealant is optionally, but preferably, used between the fin and heat-resistant plastic lid. The sealant preferably includes a thermal grout capable of providing sufficient sealing to inhibit or prevent the flow of water into the module casing. More preferably, the thermal grout includes one or more adhesives, such as a silicon adhesive. An exemplary silicon adhesive is a room temperature (RT) vulcanizing silicon adhesive.

In another embodiment, a mechanical fastener is optionally but preferably used to hold the lid tightly against the rest of the module, which has the desirable effect of pressing the flexible insulating material between the heat sink and the circuit board to prevent lateral slippage of the insulating material. For example, such mechanical fasteners include one or more clips, clamps, screws, bolts, nails, interlocking portions, or the like, or a combination thereof. Alternatively, one or more adhesives can be used in place of or in addition to one or more mechanical fasteners. In one preferred embodiment, the lid is held to the rest of the module casing with one or more screws.

In one embodiment, a plurality of terminals can be rammed into the module casing to provide electrical connections between the circuit board containing the electronic controller board inside the module and the plug or other wiring outside the module casing. Terminals so rammed into the module are optionally, but preferably, pasted to the circuit board with an electrically conductive paste. This can advantageously inhibit or avoid plastic waste, bent pins or terminals, and even the need for subsequent soldering of the terminals to the circuit board. In an exemplary embodiment, there are about 2 to 6 terminals and they extend through the module on a side opposite the heat sink. Preferably, the terminals and heat sink are each disposed facing in the same direction as the height of the module, which is typically the smallest dimension of the module when considering the only heat-resistant enclosure.

The invention also relates to methods of dissipating heat from electronic controllers, particularly the controller of the present invention. This is accomplished by providing an enclosure that is at least partially non-metallic around the electronic controller, which generates at least about 15 W of heat during operation and associating a heat sink with the controller to receive heat therefrom. The heat sink dissipates a sufficient amount of heat via the heat conducting heat sink to inhibit or avoid damage to the controller and the enclosure, particularly the non-metallic portions thereof. In one embodiment, at least about 90 percent of the heat generated is dissipated via the heat sink.

Figure 4:
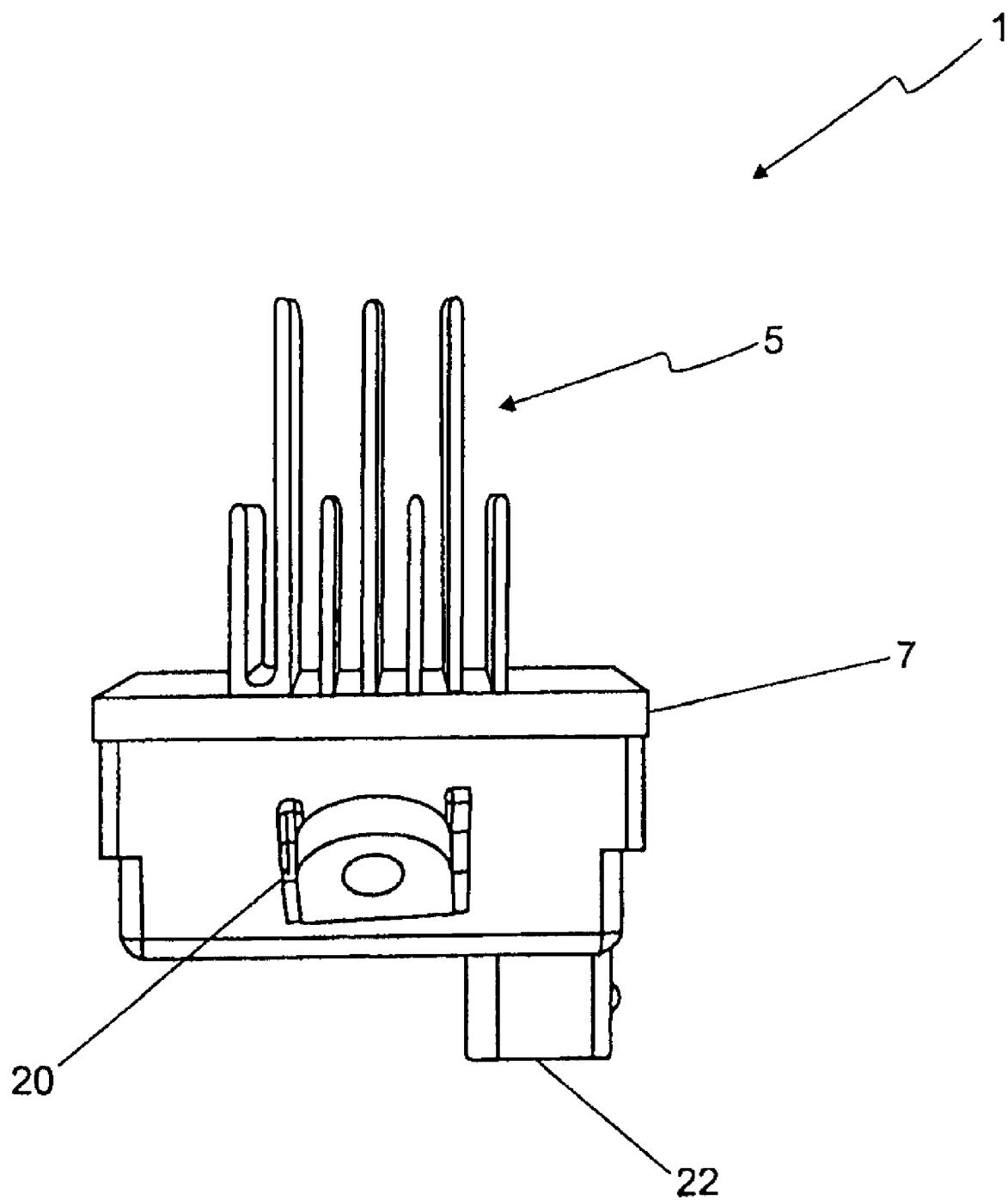
FIG. 4 is a top view of the module illustrating the heat fin and module according to the invention.

FIG. 4 shows an embodiment of a heat sink in the form of a heat fin 5 attached to a lid 7 of a module 1 according to the invention. In this embodiment, the heat fin 5 is metallic and the lid 7 is a heat-resistant material that can be the same or different as the enclosure 10 of the module 1 adjacent the lid 7.

Figure 5:
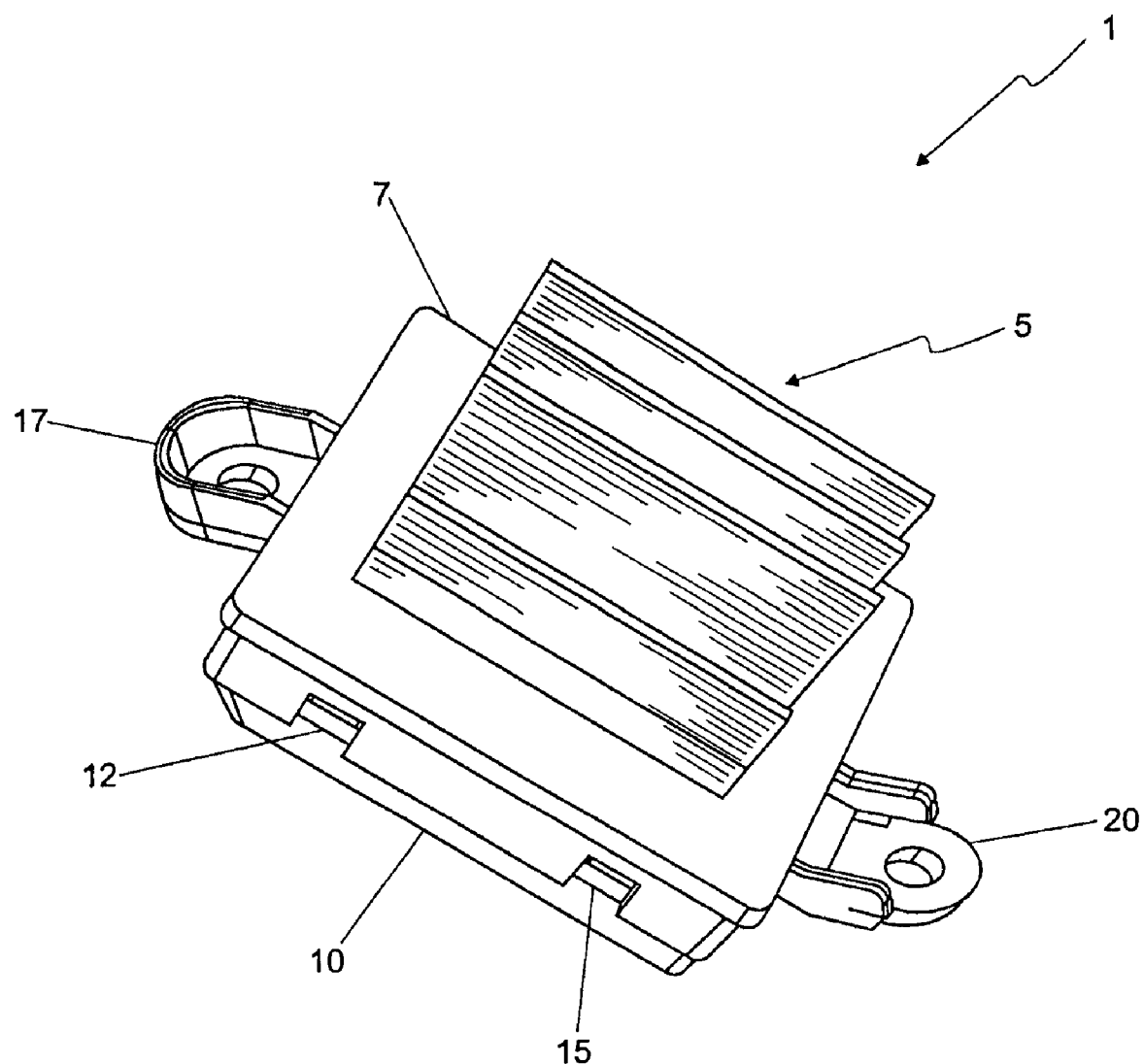
FIG. 5 is a perspective view of the top of the module and heat fins according to the invention.

FIG. 5 shows the heat fin 5 attached to the lid 7 of the module 1 according to the invention. In this perspective, the lid 7 is releasably secured to the remainder of the enclosure 10 by a plurality of projections and recesses 12, 15. Also depicted in this embodiment are two projections 17, 20 integrally formed with the module that can be used to releasably, or non-releasably, securely fasten the module 1 to a desired location, e.g., in an automobile system having a motor.

Figure 6:
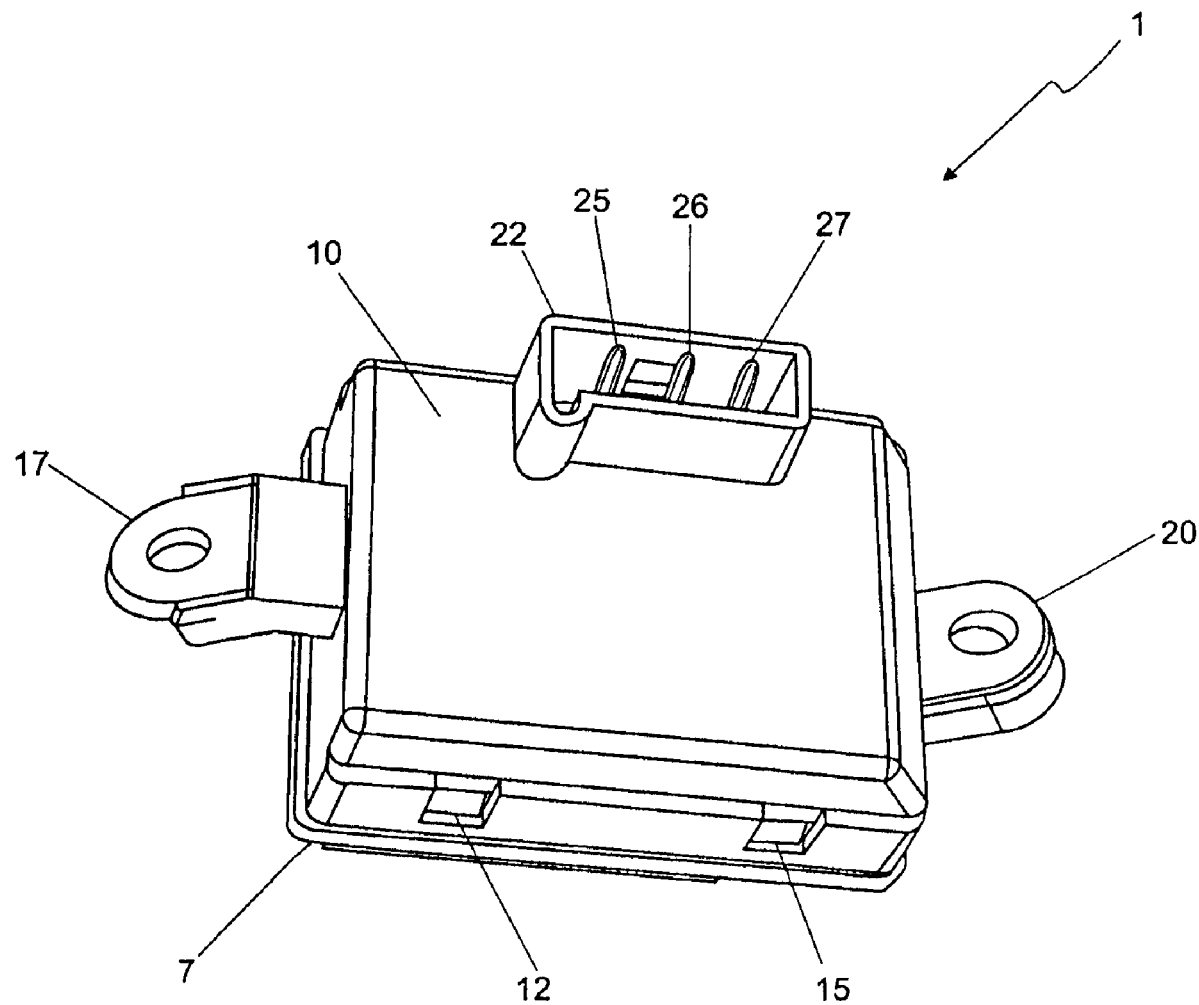
FIG. 6 is a perspective view of the bottom of the module and electrical member(s) according to the invention.

FIG. 6 shows the bottom of the module 1 containing the electronic controller (not shown) in one embodiment. Two projections 17, 20 are included for fastening the module 1 to a desired location. The perspective view shows the lid 7 attached to the remainder of the enclosure 10 via the plurality of projections and recesses 12, 15. The bottom of module 1 also preferably contains a protective area 22 designed to protect an electrically conductive member 25, 26, 27 that permits information in the form of electronic signals to be transmitted between the electronic controller inside the module 1 and external motors, sensors, power sources, and the like. The electrically conductive member depicted includes 3 terminals. In another embodiment (not shown), the electrically conductive member can include a pair of wires that are connected to the controller inside the enclosure 7, 10 and pass therethrough for connection to external electrical or other components as desired. Such wires can be in the form of a plug that can be readily connected to another component as desired to facilitate assembly of the module 1 when being installed in an end-use application.

The term "about," as used herein, should generally be understood to refer to both numbers in a range of numerals. Moreover, all numerical ranges herein should be understood to include each whole integer within the range.

Although preferred embodiments of the invention have been illustrated in the accompanying drawings and described in the foregoing Detailed Description, it will be understood that the invention is not limited to the embodiments disclosed but is capable of numerous rearrangements and modifications of parts and elements without departing from the spirit and scope of the invention or the equivalent(s) of various features described herein. It will be understood that the chemical and/or mechanical details of every design may be slightly different or modified by one of ordinary skill in the art without departing from the teachings of the present invention. Thus, the present invention is not intended to be limited to the embodiments described and illustrated herein, but is to be accorded the broadest scope consistent with the teachings of the invention set forth herein.

What is claimed is:

1. An electric motor linear speed controller, comprising:
a digital to analog converter means for converting an 8-bit digital signal to an analog voltage for setting voltage across a motor;
a digital state machine means comprising a digital logic means and a state machine, which digital state machine is adapted and configured to convert the duty cycle of an input signal for output to the digital to analog converter means;
a closed loop feedback means for monitoring and setting the voltage across the motor; and
an over-current sense circuit for monitoring a current across the motor.

2. The controller according to claim 1, wherein the closed loop feedback means is adapted to set the voltage to a constant voltage across the motor.

3. The controller according to claim 1, further comprising an over/under voltage sense circuit for monitoring a supply voltage to the electric controller.

4. A system for controlling an electric automotive component comprising a component and the electric motor linear speed controller of claim 1.

5. The system according to claim 4, wherein the component is an electric motor.

6. The system according to claim 4, wherein the component is an electric light.

7. The system according to claim 4, further comprising an over/under voltage sense circuit for monitoring a supply voltage to the electric controller.

8. A circuit arrangement in a variable speed electric motor controller, comprising:
a controller logic circuit for operating a controller logic finite state machine to convert an analog signal to a digital signal, wherein the state machine sets the voltage supplied to an electric motor, wherein the controller logic circuit comprises a microprocessor and a memory, each configured for collectively controlling the state machine; and
a closed loop feedback circuit for generating a signal indicating the voltage across the electric motor, the signal being for comparison to the voltage set by the state machine.

9. The circuit arrangement of claim 8, wherein the state machine comprises at least a running state.

10. The circuit arrangement of claim 9, further comprising one or more of the following set of states: a sleep state, a lockout state, an overcurrent state, a timeout state, or a battery check state.

11. The circuit arrangement of claim 8, additionally comprising a digital to analog converter for converting an 8-bit digital signal to an analog voltage for setting the voltage supplied to the electric motor.

12. The circuit arrangement of claim 8, wherein the circuit arrangement is directly coupled with the electric motor.

13. A system for controlling an electric automotive component, comprising:
an electric light; and
an electric motor linear speed controller which comprises:
a digital to analog converter means for converting an 8-bit bit digital signal to an analog voltage for setting voltage across a motor;
a digital state machine means comprising a digital logic means and a state machine, which digital state machine is adapted and configured to convert the duty cycle of an input signal for output to the digital to analog converter means; and
a closed loop feedback means for monitoring and setting the voltage across the motor.

14. A system for controlling the speed of an electric motor comprising:
a digital to analog converter means, for converting a digital signal to analog voltage for setting a voltage across the electric motor;

a microprocessor and associated digital memory for generating the digital signal, the microprocessor configured to instantiate and operate a digital state machine for converting the duty cycle of an input signal to the microprocessor and associated digital memory, wherein the state machine sets the voltage supplied to the electric motor based on the input signal; and a closed loop feedback loop means adapted and configured to monitor the voltage across the motor and generate a signal for input to the microprocessor.

15. An automobile comprising the system of claim 14.

16. The automobile of claim 15, wherein the system comprises a temperature-control system.

17. A linear speed controller for an automotive electric motor, comprising:

a digital state machine for converting a duty cycle of an input signal for setting the voltage to be supplied to the motor;

an over-current sense circuit, for monitoring the current across the electric motor;

an over/under voltage sense circuit, for monitoring a supply voltage to the electric controller;

a digital to analog converter, for converting an 8-bit digital signal to analog voltage for setting voltage across the electric motor; and a closed loop feedback loop and configured to monitor the voltage across the motor and generate a feedback signal for adjusting the voltage supplied to the motor.

18. The linear speed controller of claim 17 wherein the duty cycle is provided to the digital state machine by digital circuitry.

19. The linear speed controller of claim 17 wherein the closed loop feedback circuit comprises a differential amplifier.

* * * * *